(12) United States Patent
Maini et al.

(10) Patent No.: US 11,933,058 B2
(45) Date of Patent: Mar. 19, 2024

(54) HYBRID MOBILE OPERATING MACHINE AND ITS FUNCTIONING METHOD

(71) Applicant: CIFA S.P.A., Senago (IT)

(72) Inventors: Paolo Dario Maini, Lissone (IT); Massimo Calculli, Novate Milanese (IT); Emanuele Zorzi, Cesano (IT)

(73) Assignee: CIFA S.P.A., Senago (IT)

( * ) Notice: Subject to any disclaimer, the term of this patent is extended or adjusted under 35 U.S.C. 154(b) by 0 days.

(21) Appl. No.: 17/947,234

(22) Filed: Sep. 19, 2022

(65) Prior Publication Data

US 2023/0090119 A1 Mar. 23, 2023

(30) Foreign Application Priority Data

Sep. 23, 2021 (IT) .................. 102021000024436

(51) Int. Cl.

| | |
|---|---|
| *E04G 21/04* | (2006.01) |
| *B60K 6/24* | (2007.10) |
| *B60K 17/28* | (2006.01) |
| *F15B 11/17* | (2006.01) |
| *F15B 15/18* | (2006.01) |

(Continued)

(52) U.S. Cl.
CPC ............ *E04G 21/0436* (2013.01); *B60K 6/24* (2013.01); *B60K 17/28* (2013.01); *F15B 11/17* (2013.01); *F15B 15/18* (2013.01); *H01M 10/425* (2013.01); *H01M 10/44* (2013.01); *H02J 7/14* (2013.01); *B60Y 2200/41* (2013.01); *B60Y 2200/92* (2013.01); *H01M 2220/20* (2013.01)

(58) Field of Classification Search
CPC ... E04G 21/0436; E04G 21/0445; B60K 6/24; B60K 17/28; B60K 25/06; F15B 11/17; F15B 15/18; H01M 10/425; H01M 10/44; H01M 2220/20; H02J 7/14; B60Y 2200/41; B60Y 2200/92; B60Y 2400/785; B60P 3/16; Y02T 10/62
See application file for complete search history.

(56) References Cited

U.S. PATENT DOCUMENTS

| 6,885,920 B2 * | 4/2005 | Yakes ................. B60L 50/61 |
| | | 180/65.245 |
| 7,391,129 B2 * | 6/2008 | Chiao ................. B60L 50/16 |
| | | 307/9.1 |

(Continued)

FOREIGN PATENT DOCUMENTS

| CN | 107364005 A | * 11/2017 | |
| CN | 209211906 U | * 8/2019 | ............. B60K 17/00 |

(Continued)

*Primary Examiner* — Laura Freedman
(74) *Attorney, Agent, or Firm* — CANTOR COLBURN LLP

(57) ABSTRACT

A hybrid mobile operating machine comprising a motor vehicle driven by an internal combustion engine, an articulated arm associated with a pipe, a pumping unit and a stabilization unit, primary services and auxiliary services, wherein the internal combustion engine is suitable to power at least a first and a second power take-off. The mobile operating machine is provided with both a first drive unit which comprises at least one electric accumulator, a first electric motor and a first hydraulic pump, and a second drive unit which comprises at least one second electric motor and a second hydraulic pump.

10 Claims, 8 Drawing Sheets

(51) Int. Cl.
*H01M 10/42* (2006.01)
*H01M 10/44* (2006.01)
*H02J 7/14* (2006.01)

(56) References Cited

U.S. PATENT DOCUMENTS

| | | | | |
|---|---|---|---|---|
| 8,103,395 | B2 * | 1/2012 | Bissontz | B60W 20/10 |
| | | | | 180/164 |
| 8,408,341 | B2 * | 4/2013 | Dalum | B60K 6/442 |
| | | | | 180/65.285 |
| 8,972,084 | B2 * | 3/2015 | Bissontz | B60K 28/165 |
| | | | | 180/165 |
| 9,651,033 | B2 * | 5/2017 | Pirri | F04B 15/02 |
| 9,796,112 | B2 * | 10/2017 | Pirri | B60P 3/16 |
| 9,796,113 | B2 * | 10/2017 | Pirri | B28C 5/421 |
| 9,850,671 | B2 * | 12/2017 | Mapelli | E04G 21/0445 |
| 9,884,431 | B2 * | 2/2018 | Pirri | B60W 10/08 |
| 10,415,556 | B2 * | 9/2019 | Wilson | B60P 3/225 |
| 10,611,345 | B2 * | 4/2020 | Maini | B66C 23/80 |
| 10,829,946 | B2 * | 11/2020 | Zorzi | E04G 21/0436 |
| 10,974,724 | B1 * | 4/2021 | Shively | B60K 6/38 |
| 11,292,154 | B2 * | 4/2022 | Pirri | E04G 21/0436 |
| 2012/0116624 | A1 * | 5/2012 | Reith | B60W 30/19 |
| | | | | 701/22 |
| 2021/0229321 | A1 * | 7/2021 | Datema | B28C 5/4272 |
| 2021/0237312 | A1 * | 8/2021 | Datema | B28C 5/4213 |
| 2021/0285450 | A1 * | 9/2021 | Seifried | E04G 21/0436 |
| 2021/0323463 | A1 * | 10/2021 | Kasten | F04B 17/03 |
| 2022/0134856 | A1 * | 5/2022 | Andringa | B60L 15/2054 |
| | | | | 74/15.4 |
| 2022/0402165 | A1 * | 12/2022 | Calculli | B28C 5/4213 |
| 2023/0295936 | A1 * | 9/2023 | Lehmann | B60L 50/15 |
| | | | | 417/234 |
| 2023/0302682 | A1 * | 9/2023 | Lehmann | B28C 5/4213 |
| | | | | 366/1 |

FOREIGN PATENT DOCUMENTS

| | | |
|---|---|---|
| DE | 102017207840 A1 * | 11/2018 |
| DE | 102018214965 A1 | 3/2020 |
| EP | 3591141 A1 | 1/2020 |
| KR | 102537793 B1 * | 5/2023 |
| WO | 2020078039 A1 | 4/2020 |
| WO | 2022033973 A1 | 2/2022 |

* cited by examiner

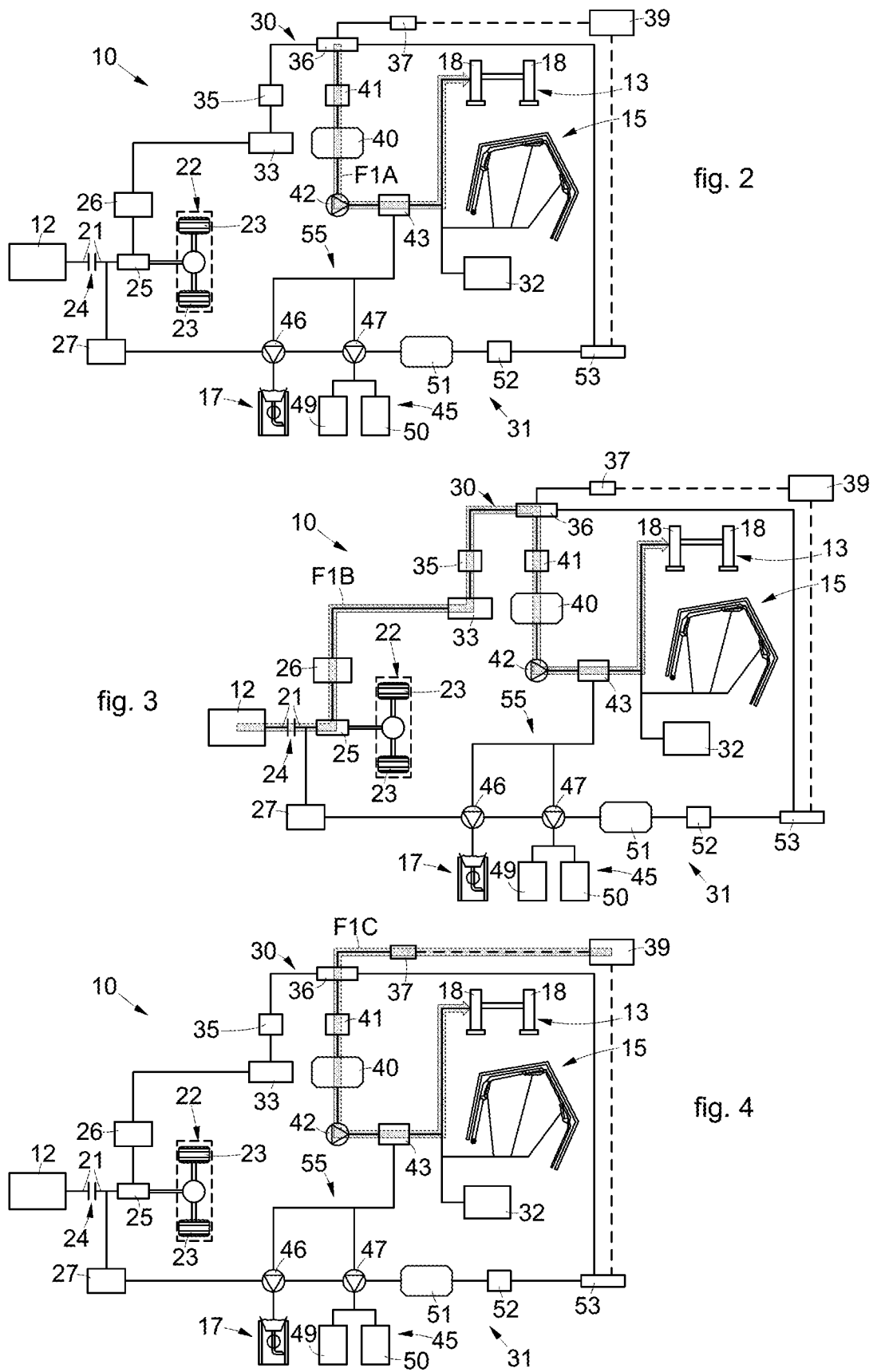

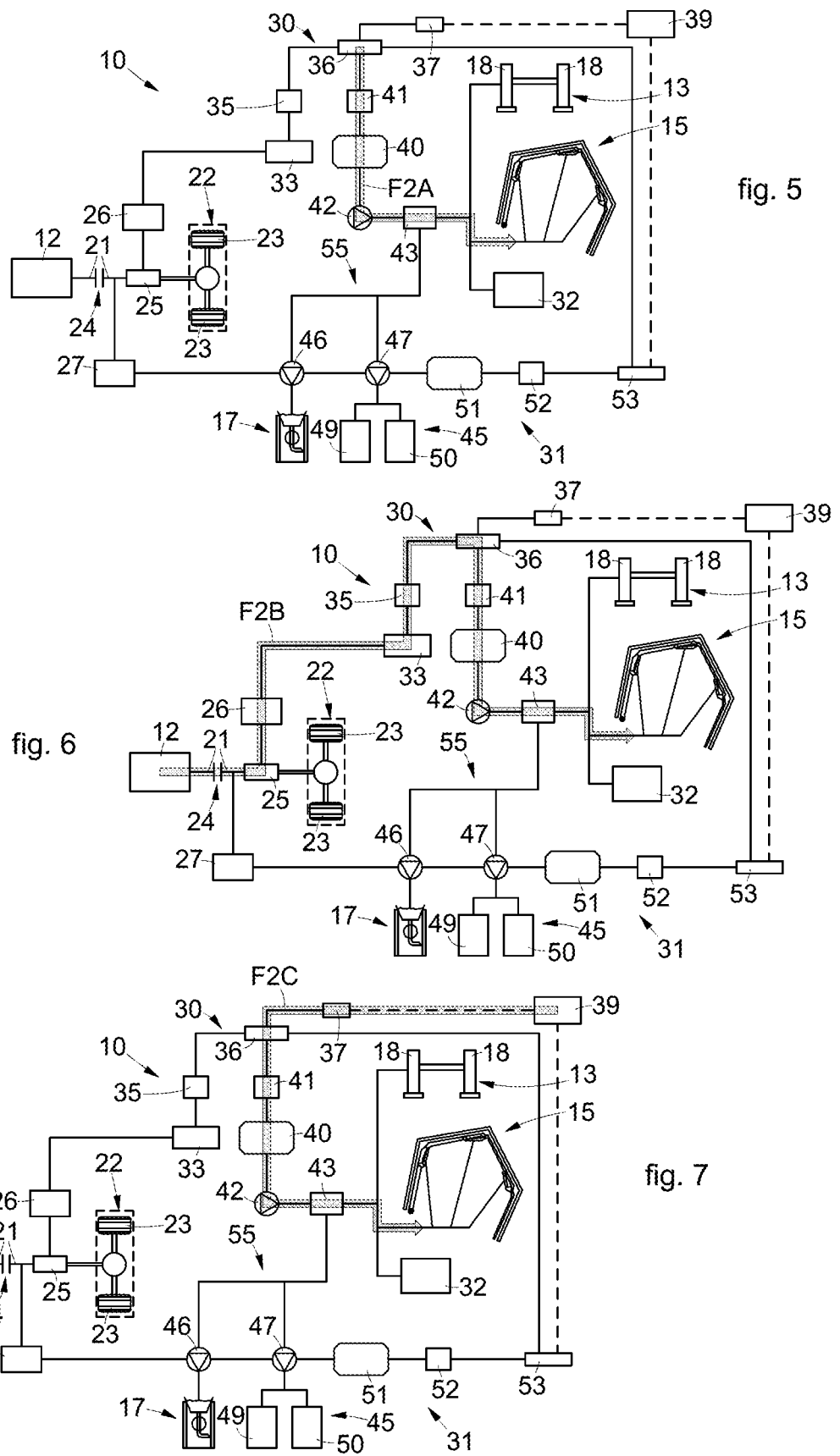

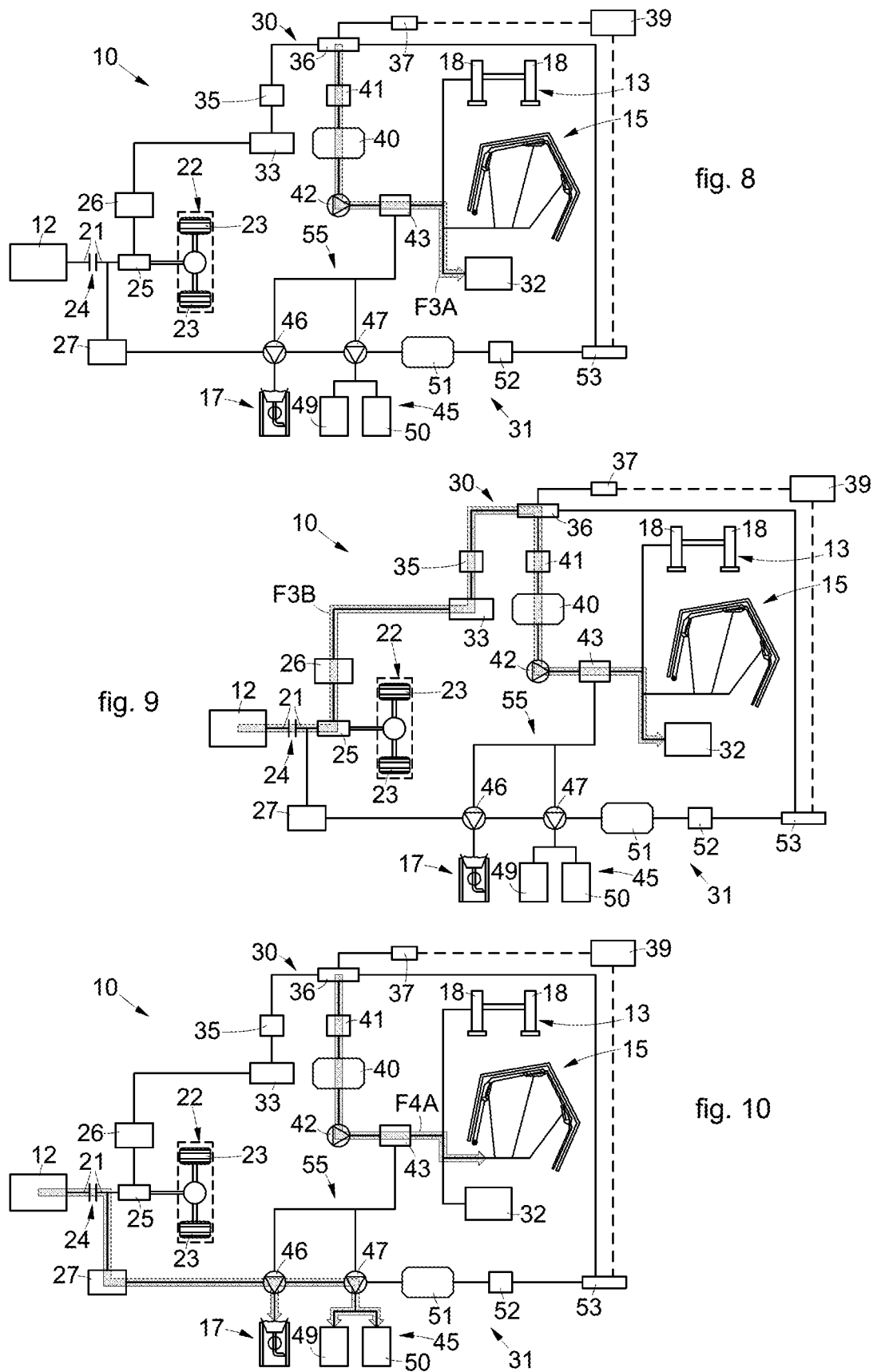

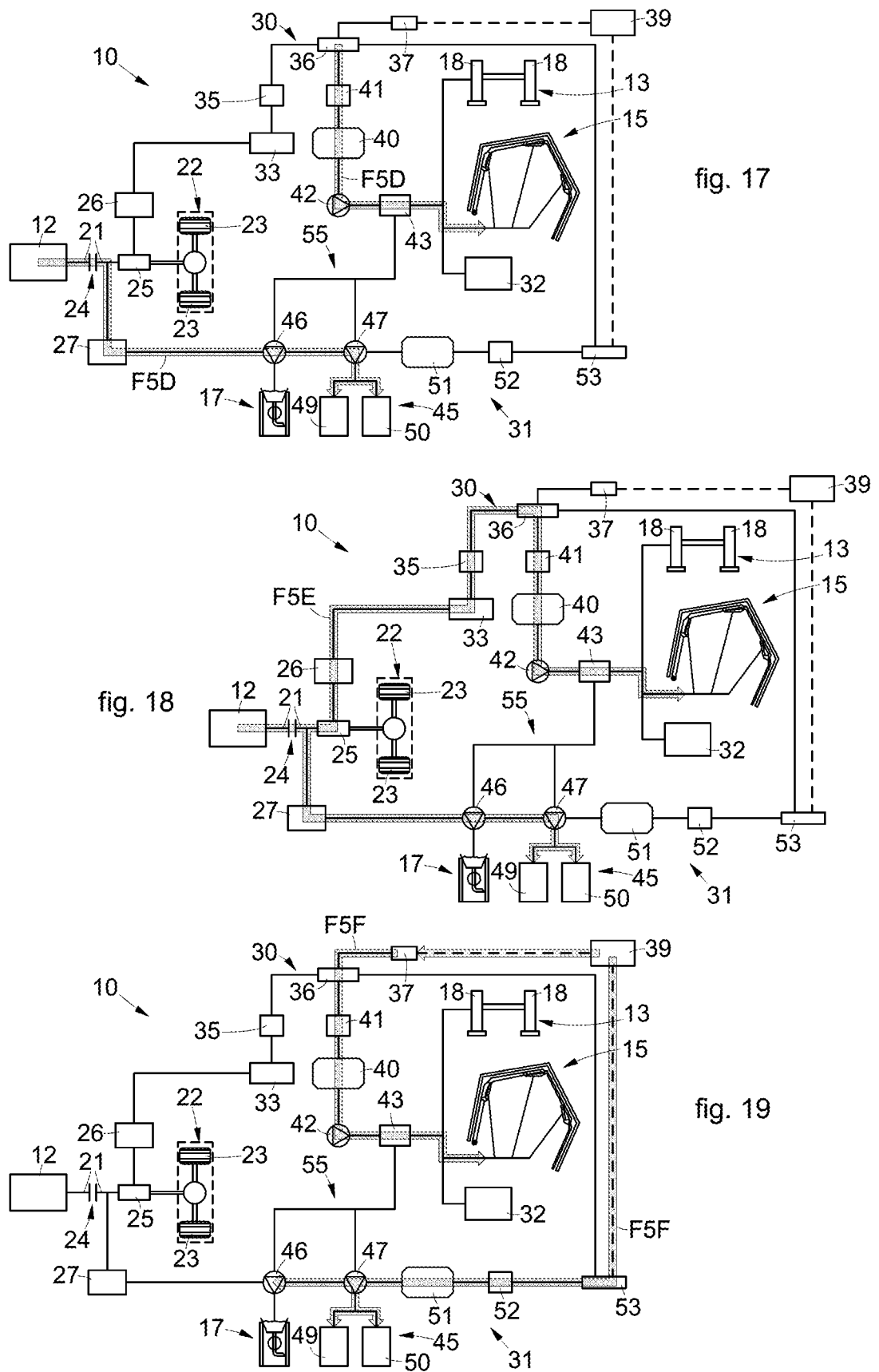

HYBRID MOBILE OPERATING MACHINE AND ITS FUNCTIONING METHOD

CROSS REFERENCE TO RELATED APPLICATION

This application is related to and claims the benefit of Italian Patent Application Number 102021000024436 filed on Sep. 23, 2021, the contents of which are herein incorporated by reference in their entirety.

FIELD OF APPLICATION

The present invention relates to a hybrid mobile operating machine and to its functioning method. In particular, the hybrid mobile operating machine is preferably a truck-mounted pump for the delivery and the distribution of concrete.

BACKGROUND ART

In the field of civil constructions, the use of mobile operating machines, such as truck-mounted pumps, or the like, i.e. pumps with relative arm for the delivery of concrete that are mounted on a transport vehicle, is known.

Typically, the truck-mounted pumps comprise a motor vehicle on which there are mounted an articulated, extendable, multi-segment arm to deliver the concrete, a pumping unit that has the function of pumping the concrete towards the delivery zone, and a stabilization unit, provided with one or more extendable support feet that have the function of stabilizing the motor vehicle during the operations of pumping and delivering the concrete.

In particular, the articulated arm is associated with a pipe that extends over its entire length, through which the concrete is pumped and which is then delivered to the zone desired by the operator. In particular, the last portion of the pipe is the one which is manipulated by the operator to perform the delivery and the targeted distribution of the concrete; furthermore, each segment, or section, of the articulated arm is associated with at least one own actuator, or a hydraulic member, which allows the rotation and the movement of one section with respect to the other.

In the current art, mobile operating machines, such as truck-mounted pumps, using hybrid-type motor solutions are known, in which in addition to the endothermic, or internal combustion, engine that moves the motor vehicle on which the pump is mounted, an electric motor is also used to allow, at least in part, the selective drive of the pumping unit, of the articulated arm or of the stabilization system.

In such known solutions, it is normally provided for the use of a mechanical coupler to manage the different sources of energy, or of power, whether they derive from the internal combustion engine or from the electric motor. This entails the drawback of always having one or more mechanical members in operation, which therefore generate noise, vibrations and lower the overall energy efficiency of the mobile operating machine.

In this regard, another drawback is that not all motor vehicle manufacturers provide for the installation of a mechanical coupler on the motor vehicle; this represents a strong limitation from a commercial and production point of view.

The document WO2020078039 discloses a pump truck having a hybrid drive. In particular, the pump truck comprises: a motor module connected with at least a main hydraulic pump and a traveling system of the pump truck; the motor module is connected with a generator, in turn connected with and a battery assembly. The motor module is used to drive a boom pump, a water washing pump, a turntable rotation, a cooling fan and a hopper of the pump truck.

In addition, the known solutions normally provide for the connection to an external electrical network for the hybrid functioning of the different operating components of the mobile operating machine, such as the stabilization system, the articulated arm and the pumping unit. This entails the drawback that without a suitable connection to the external electrical network, the drive of these operating components must be carried out by means of the internal combustion engine, causing prolonged emissions of exhaust gases and noise pollution problems.

There is therefore a need to perfect, or to realize, a hybrid mobile operating machine, in particular a truck-mounted pump for the delivery of concrete, which can overcome at least one of the drawbacks of the prior art.

To do this, it is necessary to solve at least the technical problem of allowing multiple power sources to be managed without the use of a mechanical coupler.

One object of the present invention is to realize a hybrid mobile operating machine, in particular a truck-mounted pump, which is efficient and extremely versatile in relation to the energy sources used and for the different modes of use for which the machine is intended.

Another object of the present invention is to realize a hybrid mobile operating machine that reduces polluting emissions and noise emissions when it is in operation.

Another object of the present invention is to realize a hybrid mobile operating machine in which the drive of at least some, preferably all, of the operating components of the operating machine takes place without the aid of the internal combustion engine, for example even when the motor vehicle is stationary.

A further object of the present invention is to realize a hybrid mobile operating machine in which the absence of additional mechanical members, such as a mechanical coupler, makes it possible to have more space available on the machine itself and to be less constrained by the type of motor vehicle used.

In order to overcome the drawbacks of the prior art and to achieve this and further purposes and advantages, the Applicant has studied, experimented with and realized the present invention.

DISCLOSURE OF THE INVENTION

The present invention is expressed and characterized in the independent claims. The dependent claims set forth other features of the present invention or variants of the main solution idea.

In accordance with the aforesaid purposes, and to solve the aforesaid technical problem in a new and original way, also obtaining considerable advantages with respect to the state of the prior art, a hybrid mobile operating machine according to the present invention, comprises a motor vehicle driven by an internal combustion engine, an articulated arm associated with a concrete delivery pipe, a pumping unit suitable to pump concrete into the aforesaid pipe, a stabilization unit to stabilize the operating machine during the pumping and delivery of the concrete, and primary services, wherein the aforesaid internal combustion engine is suitable to power at least a first power take-off and a second power take-off, which can be activated selectively with respect to each other.

In accordance with an aspect of the present invention, to the aforesaid first power take-off there is operatively connected a first drive unit comprising at least an electric accumulator, a first electric motor and a first hydraulic pump to selectively drive at least the aforesaid stabilization unit, the aforesaid articulated arm and the aforesaid primary services, and to the aforesaid second power take-off there is operatively connected a second drive unit comprising at least a second electric motor and a second hydraulic pump to drive at least the aforesaid pumping unit. Further, the aforesaid first drive unit and the aforesaid second drive unit are operatively associated with each other and independent from each other, so that when one of either the aforesaid first drive unit or the aforesaid second drive unit is activated, it is possible to keep the other deactivated.

In accordance with one aspect of the present invention, the aforesaid first drive unit and the aforesaid second drive unit are configured to be selectively connected to an external electrical energy source to recharge the aforesaid electric accumulator and, respectively, drive the aforesaid second electric motor.

In accordance with another aspect of the present invention, the aforesaid electric accumulator is provided with a connection device configured to connect at least the aforesaid electric accumulator to the aforesaid external electrical energy source, wherein the aforesaid connection device can be moved by means of the aforesaid primary services, and wherein the aforesaid electric accumulator is associated with a generator operatively connected to the aforesaid first power take-off and configured to receive mechanical energy at entry and generate electrical energy at output to recharge the aforesaid electric accumulator.

In accordance with another aspect of the present invention, the hybrid mobile operating machine is also provided with secondary services and the aforesaid second drive unit further comprises a third hydraulic pump to drive at least the aforesaid secondary services; furthermore, the aforesaid second hydraulic pump and the aforesaid third hydraulic pump can be driven, even simultaneously, by the aforesaid internal combustion engine or by the aforesaid second electric motor.

In accordance with another aspect of the present invention, the aforesaid second electric motor is operatively connected to the aforesaid electric accumulator and is configured to assume at least a first operating condition, in which it converts the electrical energy supplied by the aforesaid external electrical energy source into mechanical energy that drives the aforesaid second and third hydraulic pumps, and a second operating condition, in which it converts the mechanical energy of the aforesaid internal combustion engine into electrical energy to recharge the aforesaid electric accumulator.

In accordance with another aspect of the present invention, the aforesaid generator, the aforesaid first electric motor and the aforesaid second electric motor are each provided with a respective converter configured to manage the direct and/or alternating electrical energy at input and output of the aforesaid generator, the aforesaid first electric motor and, respectively, the aforesaid second electric motor.

In accordance with another aspect of the present invention, the hybrid operating machine comprises a central control unit operatively connected at least to the aforesaid internal combustion engine, to the aforesaid electric accumulator, to the aforesaid first electric motor and to the aforesaid second electric motor, and configured to automatically manage the drive of the aforesaid first drive unit and the aforesaid second drive unit so as to favor and prefer an electrical functioning of the aforesaid stabilization unit, of the aforesaid articulated arm, of the aforesaid pumping unit, of the aforesaid primary services and of the aforesaid auxiliary services, whether it derives from the aforesaid electric accumulator, or from the aforesaid external electrical energy source.

In accordance with another aspect of the present invention, a functioning method of a hybrid mobile operating machine comprising a motor vehicle, driven by an internal combustion engine, on which there are mounted at least a stabilization unit, an articulated arm, a pumping unit and primary services, provides one or more functioning steps of a first drive unit that is operatively connected to a first power take-off driven by said internal combustion engine, in which the aforesaid stabilization unit, the aforesaid articulated arm and the aforesaid primary services are driven by a first hydraulic pump by means of a first electric motor powered by an electric accumulator of said first drive unit, and one or more functioning steps of a second drive unit that is operatively connected to a second power take-off driven by said internal combustion engine, in which the aforesaid pumping unit is driven by a second hydraulic pump by means of a second electric motor of said second drive unit, and in which the aforesaid first drive unit and the aforesaid second drive unit are driven independently of each other, so that when one of either said first drive unit or said second drive unit is activated, it is possible to keep the other deactivated.

In accordance with another aspect of the present invention, the method provides at least one connection step, in which the aforesaid first drive unit and the aforesaid second drive unit are selectively connected to an external electric energy source, to recharge the aforesaid electric accumulator and, respectively, drive the aforesaid second electric motor.

In accordance with another aspect of the present invention, the method provides at least one functioning step of the aforesaid second drive unit in which the aforesaid pumping unit is driven by the aforesaid internal combustion engine if the aforesaid electric motor cannot be connected to the aforesaid external electrical energy source.

ILLUSTRATION OF THE DRAWINGS

These and other aspects, features and advantages of the present invention will become clear from the disclosure of some embodiments, provided by way of non-limiting example, with reference to the accompanying drawings in which:

FIGS. 2, 3 and 4 are schematic representations of a first driving step of the mobile operating machine of FIG. 1;

FIGS. 5, 6 and 7 are schematic representations of a second driving step of the mobile operating machine of FIG. 1;

FIGS. 8 and 9 are schematic representations of a third driving step of the mobile operating machine of FIG. 1;

FIGS. 10, 11, 12 and 13 are schematic representations of a fourth driving step of the mobile operating machine of FIG. 1;

FIGS. 14, 15, 16, 17, 18 and 19 are schematic representations of a fifth driving step of the mobile operating machine of FIG. 1;

It should be noted that, in the present disclosure, the phraseology and terminology used, as well as the figures in the accompanying drawings, even as disclosed, have the sole purpose of illustrating and explaining the present invention, since their function is illustrative and not limited to the invention itself, the scope of protection thereof being defined by the claims.

To facilitate understanding, identical reference numbers have been used, where possible, to identify identical common elements in the figures. It should be noted that elements and features of an embodiment can be conveniently combined or incorporated into other embodiments without further clarification.

DESCRIPTION OF SOME EMBODIMENTS OF THE PRESENT INVENTION

Figure 1:
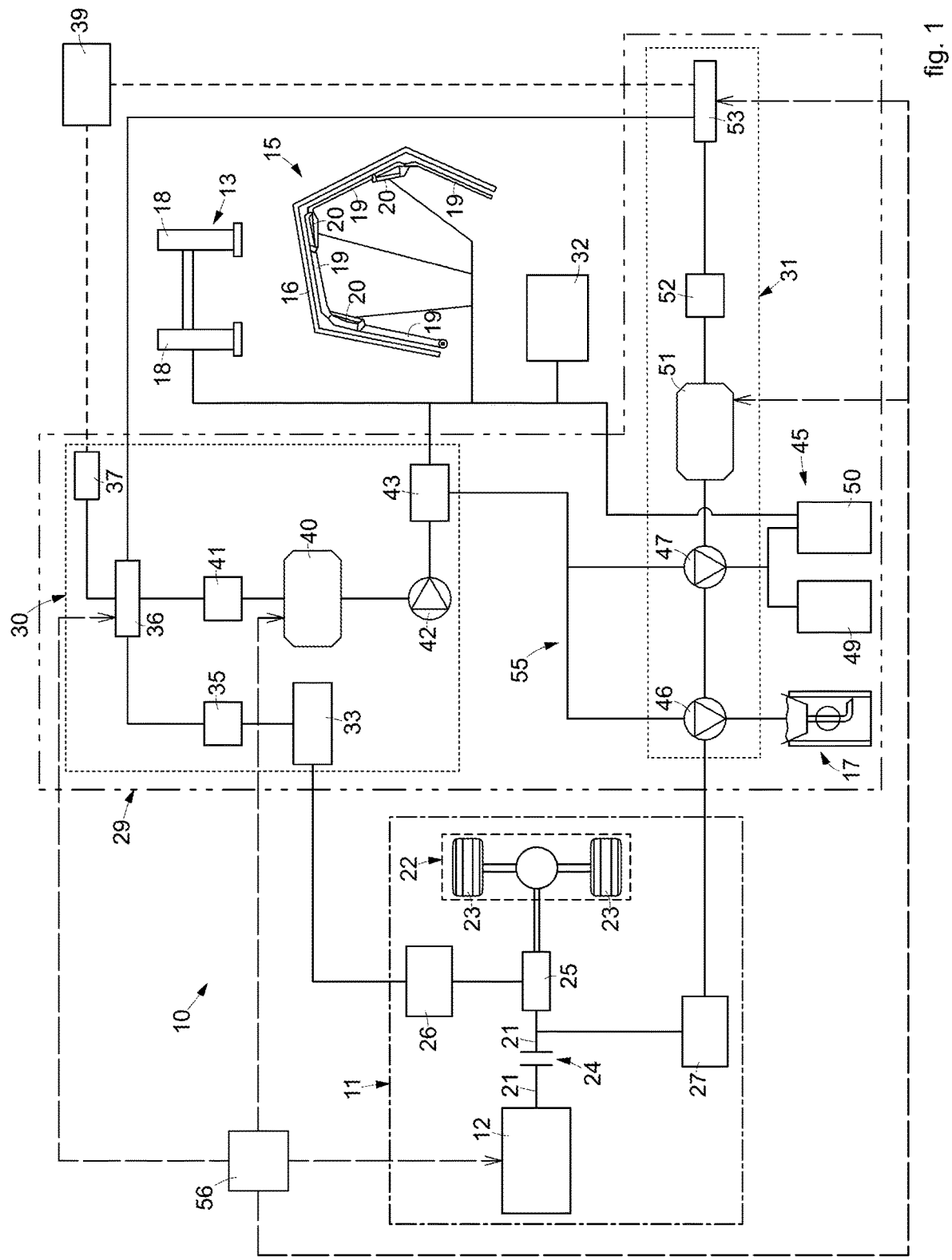
FIG. 1 is a schematic representation of a hybrid mobile operating machine, according to the present invention.

With reference to FIG. 1, a hybrid mobile operating machine 10 according to the present invention, hereinafter referred to as operating machine 10, is used for the distribution and the delivery of concrete in operating places, for example in construction sites. Preferably, the operating machine 10 is a truck-mounted pump.

The operating machine 10 comprises, schematically, a motor vehicle 11 of a conventional type, represented as a whole with a first dashed line, which is moved by an endothermic, or internal combustion, engine 12, for example a diesel engine.

A plurality of operating components is mounted on the motor vehicle 11, such as a stabilization unit 13 to stabilize the operating machine 10 once it has reached the operating place, an articulated arm 15 to which there is associated an extensible concrete delivery pipe 16, a pumping unit 17 to pump the concrete towards the extensible pipe 16, as well as other primary and auxiliary services.

The stabilization unit 13 comprises one or more support devices 18, for example extendable support feet, preferably distributed symmetrically on the perimeter of the operating machine 10.

The articulated arm 15 comprises both a plurality of sections 19, mutually articulated and moved, for example, by means of respective actuators 20, and the extensible pipe 16, associated with the sections 19, through which the concrete is pumped towards the delivery zone.

The internal combustion engine 12 is provided with a crankshaft, not represented in the drawings, which allows a transmission shaft 21 of a movement unit 22, which in turn is provided with wheels 23, to rotate. A clutch 24 and a gearbox 25 of any known type can be associated with the transmission shaft 21 to cause the drive of the movement unit 22.

In addition, two power take-offs 26 and 27 which can be activated selectively with respect to each other are connected to the internal combustion engine 12, wherein a first power take-off 26 is operatively associated with the gearbox 25, and a second power take-off 27 is operatively associated with the transmission shaft 21. In particular, the internal combustion engine 12 is suitable to selectively power, via a kinematic chain, the first power take-off 26 and the second power take-off 27.

The operating machine 10 further comprises a drive apparatus 29, indicated as a whole with a second dashed line, operatively connected to the power take-offs 26 and 27 of the internal combustion engine 12 and configured to drive the stabilization unit 13, the articulated arm 15, the pumping unit 17 and the other primary and auxiliary services.

In accordance with an aspect of the present invention, the drive apparatus 29 comprises a first drive unit 30 operatively connected to the first power take-off 26, and a second drive unit 31 operatively connected to the second power take-off 27. The two drive units 30 and 31, indicated as a whole in FIG. 1 with a respective third dashed line, are operatively associated with each other, but are independent from each other, in this way it is possible to selectively drive them in such a way as to activate one and keep the other deactivated.

In accordance with embodiments of the present invention, the first drive unit 30 is configured to drive at least the stabilization unit 13, the articulated arm 15, and one or more primary services 32, as will be explained below in detail.

The first drive unit 30 comprises a generator 33 operatively connected, for example mechanically, to the first power take-off 26 and configured to receive mechanical energy at entry and generate electrical energy at output. The generator 33 is associated with a first converter 35, which performs the function of an inverter so as to convert the alternating electrical energy at entry into direct electrical current at output.

The first converter 35 is operatively connected to an electric accumulator 36 comprising one or more electrical batteries, and is provided with a connection device 37, for example a charging cable, configured to connect at least the electric accumulator 36 to an external electrical energy source, for example an electrical network 39, and thus recharge the batteries present in said electric accumulator 36.

It should be noted that the connection device 37 can allow the connection, and therefore the power supply to the electrical network 39, of all the electrical actuations available on the operating machine 10.

The first drive unit 30 also comprises a first electric motor 40 provided with a respective converter, hereinafter the second converter 41, which is connected to the electric accumulator 36 and acts as an inverter for the management of the direct and/or alternating electrical energy of the first electric motor 40 itself.

The first electric motor 40 is thus powered by the electric accumulator 36 which supplies it electrical energy both when the charging level of the batteries is sufficient and is disconnected from the electrical network 39, and when it is in a recharging condition and is connected to the electrical network 39 by means of the connection device 37.

In addition, the first electric motor 40 is operatively connected to a first hydraulic pump 42 and is configured to drive the latter by converting the electrical energy of the electric accumulator 36 into mechanical driving energy.

The first hydraulic pump 42 is configured to pump a working fluid and cause the selectively alternating drive of the stabilization unit 13, of the articulated arm 15, and of the primary services 32. These primary services 32 provide, for example, for the movement of the connection device 37. By way of example, if the connection device 37 is a charging cable, the movement consists in the unwinding and in the subsequent winding of the latter.

In particular, the first hydraulic pump 42 is operatively connected both to the support devices 18, to supply them the working fluid so that they can be moved to stabilize and secure the operating machine 10 before and during the pumping and the delivery of the concrete, and to the actuators 20, to supply them the working fluid so that the articulated arm 15 can assume the desired position.

In addition, the first hydraulic pump 42 may also be associated with a working fluid distribution device 43, configured to correctly regulate and distribute the working fluid towards the stabilization unit 13, the articulated arm 15 and the primary services 32.

In accordance with embodiments of the present invention, the second drive unit 31 is configured to drive at least the pumping unit 17 and one or more auxiliary services 45 and comprises at least a second hydraulic pump 46, to drive the pumping unit 17, which is operatively connected to the second power take-off 27, and a third hydraulic pump 47, to drive the auxiliary services 45, which is operatively connected, for example mechanically, to the second hydraulic pump 46.

In particular, the third hydraulic pump 47 is configured to selectively drive at least a first auxiliary service 49, for example the recirculation of the cooling liquid inside the radiator of the operating machine 10, or inside an external radiator, not illustrated, which cools the hydraulic system of the operating machine 10, and a second auxiliary service 50 which provides, for example, for the drive of cleaning devices and/or of concrete mixing devices, which are advantageously operatively associated with the articulated arm 15.

The second drive unit 31 also comprises a second electric motor 51 which is operatively connected to the third hydraulic pump 47 and to the second hydraulic pump 46 and is provided with a respective converter, hereinafter the third converter 52, which acts as an inverter for the management of the direct and/or alternating electrical energy of the second electric motor 51 itself.

In accordance with embodiments of the present invention, the third converter 52 can be connected both to the electrical network 39, for example by means of a respective connection device not represented in the drawings, to drive the second electric motor 51, and to the electric accumulator 36 to allow the batteries present therein to be recharged using the electrical energy supplied by the second electric motor 51, which in this case is driven by means of the internal combustion engine 12.

Furthermore, a switch 53 can be advantageously associated with the third converter 52 and which has the function of allowing the third converter 52 to connect, in a selectively alternating manner, to the electrical network 39, or to the electric accumulator 36.

In accordance with another aspect of the present invention, the second electric motor 51 can therefore assume at least a first operating condition in which it converts the electrical energy supplied by the electrical network 39 into mechanical driving energy for the hydraulic pumps 46 and 47, and a second operating condition in which it converts the mechanical energy of the internal combustion engine 12 into electrical energy to recharge the electric accumulator 36. Therefore, the second electric motor 52 may function both as a motor and as a generator.

It should be noted that the drive of the second electric motor 51 takes place only through the energy supplied by the internal combustion engine 12, or by the electrical network 39, and not by means of the energy supplied by the electric accumulator 36.

In accordance with embodiments of the present invention, the first hydraulic pump 42 can also be operatively connected to the second auxiliary service 50, so that under specific operating conditions, the drive, or the activation, of the latter can be performed by said first hydraulic pump 42.

In addition, the hydraulic pumps 46 and 47 can also be operatively connected, by means of an emergency circuit 55, to the working fluid distribution device 43. Thereby, the advantage is obtained that if the first drive unit 30 is in a faulty condition, the stabilization unit 13, the articulated arm 15 and the primary services 32, can be driven via the second hydraulic pump 46, or the third hydraulic pump 47, or both.

The operating machine 10 also comprises a central control unit 56, which is operatively connected to at least the internal combustion engine 12, to the electric accumulator 36, to the first electric motor 40 and to the second electric motor 51 and to the switch 53.

In particular, the central control unit 56 is programmed to automatically manage the drive of the first drive unit 30 and the second drive unit 31, so as to favor and prefer an electrical functioning of the stabilization unit 13, of the articulated arm 15, of the pumping unit 17, of the primary services 32 and of the auxiliary services 45, whether it derives from the electric accumulator 36 or from the electrical network 39. Of course, the functioning by means of the internal combustion engine 12 is regularly envisaged in the absence of an electrical network 39, or if the electric accumulator 36 is discharged.

It should therefore be noted that the operating machine 10 can function using three different energy sources, namely the internal combustion engine 12, the electric accumulator 36 and the electrical network 39. Thus, the operating machine 10 has the advantage of being able to function by means of electrical energy even if there is no external electrical energy source, like the electrical network 39.

Furthermore, the fact that the first and the second drive units 30 and 31 are independent of each other, results in the advantage that one of the two drive units 30 or 31 can be used, or arranged, in mobile operating machines in which the other drive unit is made according to what is already present in the state of the art.

In accordance with other embodiments of the present invention, not represented in the drawings, between the second power take-off 27 and the second hydraulic pump 46 a disengagement device can be provided that has the function of allowing any mechanical changes on the power take-off 27, which are otherwise not actuatable.

The functioning of the operating machine 10 described so far, which corresponds to the method according to the present invention, comprises at least five main driving steps.

It is specified that the order in which the main driving steps are numbered is purely indicative, therefore they are not to be considered sequential. Furthermore, any step, or operating sequence, substantially equal to one already described, will not be described again.

In general, the functioning of the operating machine 10 provides for the oleodynamic actuation of the hydraulic pumps 42, 46 and 47, which drive the different operating components of the operating machine 10, by means of electromechanical energy sources, such as the internal combustion engine 12, the electric accumulator 36 and the electrical network 39. The selection of such energy sources, when possible, is performed automatically by the central control unit 56, which favors and prefers the drive of the operating components of the operating machine 10 through the electric accumulator 36 and the electrical network 39, instead of through the internal combustion engine 12.

It should also be noted that initially the operating machine 10 is moved by the internal combustion engine 12, to reach the desired position in a construction site.

In a first main step, or stabilization step, illustrated in FIGS. 2, 3 and 4, the drive of the stabilization unit 13 takes place according to three possible functioning modes F1A, F1B and F1C that provide for the use of the first drive unit 30.

In particular, a first functioning mode F1A, illustrated in FIG. 2, provides for the following secondary steps:

the internal combustion engine 12 is switched off, the electric accumulator 36 is charged and begins to supply electrical energy to the first electric motor 40;

the electrical energy supplied by the electric accumulator 36 first passes through the converter 41 which makes it correctly usable by the first electric motor 40;

the first electric motor 40 then transforms the electrical energy at entry into mechanical driving energy to drive the first hydraulic pump 42;

the first hydraulic pump 42 pumps the working fluid towards the distribution device 43 to thus activate the stabilization unit 13, causing one or more support devices 18 to lower so as to stabilize the operating machine 10 for the subsequent pumping and the subsequent delivery of the concrete.

A second functioning mode F1B, illustrated in FIG. 3, provides for the following alternative secondary steps:

the electric accumulator 36 is discharged and no electrical network 39 is present on site, therefore the internal combustion engine 12 is driven to recharge the batteries of the electric accumulator 36;

the internal combustion engine 12, by means of the first power take-off 26, transmits mechanical energy to the generator 33 which transforms it into electrical energy;

the electrical energy of the generator 33 passes through the first converter 35 which makes it correctly usable to recharge the electric accumulator 36;

once the electric accumulator 36 reaches the minimum recharging level, it begins to supply electrical energy to the first electric motor 40 and the secondary steps described for the first functioning mode F1A are repeated.

A third functioning mode F1C, illustrated in FIG. 4, provides for the following alternative secondary steps:

the electric accumulator 36 is discharged, but in this case, the electrical network 39 is present on site; therefore, the connection device 37 is moved and connected to the electrical network 39, according to the modes that will be described below (see functioning mode F3B), to recharge the electric accumulator 36 and then repeat the secondary steps described above for the first functioning mode F1A.

It should be noted that the repositioning of the stabilization unit 13 in a non-operating condition can take place with the same modes, or operating sequences, with which it is driven.

In a second main step, or arm opening step, illustrated in FIGS. 5, 6 and 7, the opening of the articulated arm 15 takes place according to three possible functioning modes F2A (FIG. 5), F2B (FIG. 6) and F2C (FIG. 7). In particular, the opening of the articulated arm 15 (FIG. 1) takes place by driving the actuators 20 that allow the articulated arm 15 to move to and reach the desired position and/or extension.

The three functioning modes F2A (FIG. 5), F2B (FIG. 6) and F2C (FIG. 7) provide for the use of the first drive unit 30 and substantially repeat the same secondary steps of the functioning modes F1A, F1B and F1C of the first main step, being differentiated only in the drive of the articulated arm 15 instead of the stabilization unit 13.

It should be noted that the repositioning of the articulated arm 15 in a non-operating condition can take place with the same modes, or operating sequences, with which it is driven.

In a third main step, or connection step, illustrated in FIGS. 8 and 9, the drive of the primary services 32 takes place according to two possible functioning modes F3A (FIG. 8) and F3B (FIG. 9). In particular, the drive of the primary services 32 allows the movement of the connection device 37 so as to connect the electric accumulator 36 to the electrical network 39.

The two functioning modes F3A (FIG. 8) and F3B (FIG. 9) provide for the use of the first drive unit 30 and substantially repeat the same secondary steps of the two functioning modes F1A and F1B of the first main step, being differentiated only in the drive of the primary services 32 instead of the stabilization unit 13.

In a fourth main step, or pumping and movement step, illustrated in FIGS. 10, 11, 12 and 13, the movement of the articulated arm 15 in the desired position and the consequent delivery of the concrete through the drive of the pumping unit 17 take place. This may take place by means of four possible functioning modes F4A, F4B, F4C, and F4D that provide for the use of both drive units 30 and 31.

A first functioning mode F4A, illustrated in FIG. 10, provides for the following secondary steps:

the articulated arm 15 is driven like in the first functioning mode F1A of the first main step;

the internal combustion engine 12 is driven and through the second power take-off 27 transmits mechanical energy to the second hydraulic pump 46, to drive the pumping unit 17 and deliver the concrete, and to the third hydraulic pump 47 to selectively drive the auxiliary services 45, for example to perform the mixing of the concrete.

Figures 11, 12, 13:
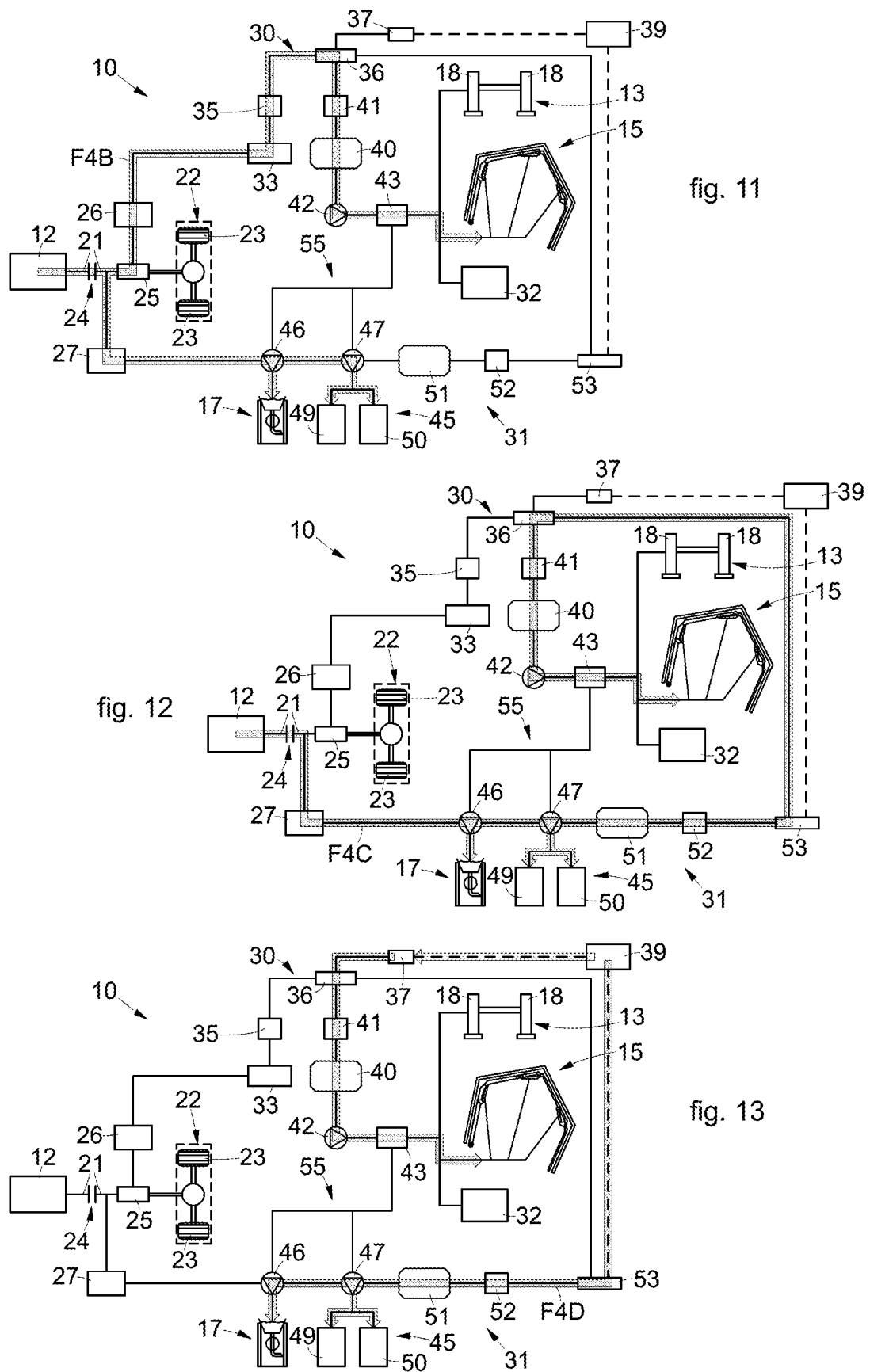

A second functioning mode F4B, illustrated in FIG. 11, provides for the following alternative secondary steps:

the articulated arm 15 is driven like in the second functioning mode F1B of the first main step;

the auxiliary services 45 and the pumping unit 17 are driven like in the first functioning mode F4A of the fourth main step.

A third functioning mode F4C, illustrated in FIG. 12, provides for the following alternative secondary steps:

the electric accumulator 36 is discharged to drive the articulated arm 15 and, no electrical network 39 is present on site, therefore the internal combustion engine 12 is driven to alternatively charge the electric accumulator 36;

the internal combustion engine 12, through the second power take-off 27, supplies mechanical energy, in addition to the hydraulic pumps 46 and 47, also to the second electric motor 51;

the second electric motor 51 transforms the mechanical energy into electrical energy that by passing through the third converter 52 is made correctly usable to recharge the electric accumulator 36, in this case the switch 53 is driven so that the operating connection is allowed between the third converter 52 and the electric accumulator 36;

the articulated arm 15 is thus driven like in the first functioning mode F1A of the first main step;

the pumping unit 17 and the auxiliary services 45 are driven by means of the internal combustion engine 12 like in the first functioning mode F4A of the fourth main step.

A fourth functioning mode F4D, illustrated in FIG. 13, provides the following alternative secondary steps:

the articulated arm 15 can be driven like in the first mode F1A, or like in the third mode F3A, of the first main step;

the internal combustion engine is switched off and the drive of the pumping unit 17 and of the auxiliary services 45 is performed by means of the electrical energy supplied by the second electric motor 51 which is connected to the electrical network 39, in this case the switch 53 is driven so that the operating connection is allowed between the third converter 52 and the electrical network 39;

the energy supplied by the electrical network 39 by passing through the third converter 52 is made correctly usable by the second electric motor 51 which transforms it into mechanical energy for the drive of the hydraulic pumps 46 and 47, which, by pumping the working fluid, can drive the pumping unit 17 and, respectively, the auxiliary services 45.

In a fifth main step, or cleaning step, illustrated in FIGS. 14, 15, 16, 17, 18 and 19, the movement of the articulated arm 15 in the desired position and the consequent cleaning of the operating components of the operating machine 10 by driving cleaning devices of the second auxiliary service 50 take place. This may take place by means of six possible functioning modes F5A, F5B, F5C, F5D, F5E, F5F, wherein the first three modes F5A, F5B, F5C provide for the use of only the first drive unit 30, whereas the other three modes F5D, F5E, F5F provide for the use of both drive units 30 and 31.

Figures 14, 15, 16:
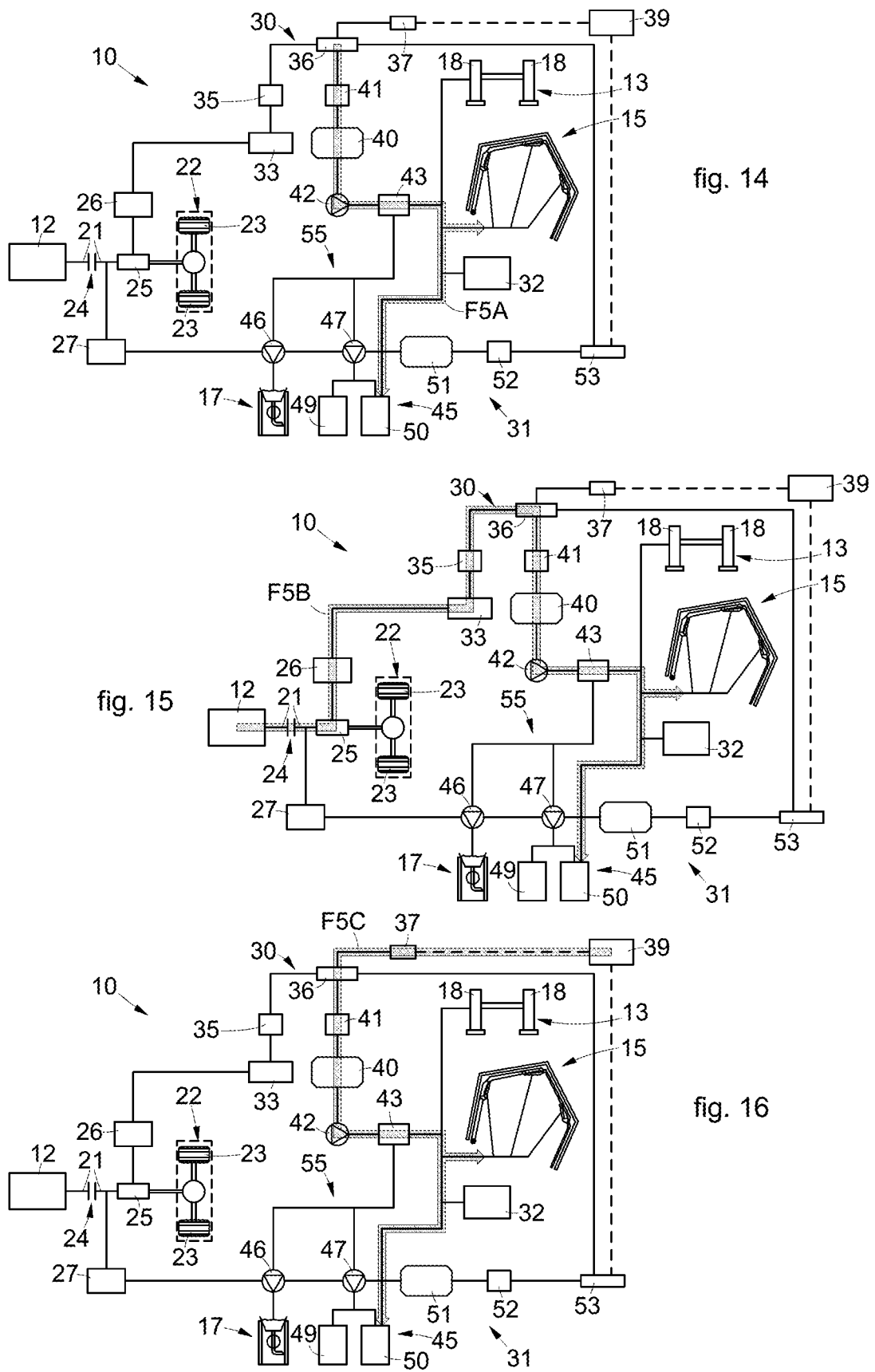

In a first, second and third functioning modes F5A (FIG. 14), F5B (FIG. 15) and F5C (FIG. 16) the articulated arm 15 is driven like in the corresponding first, second and third functioning mode F1A, F1B and F1C of the first main step. The second auxiliary service 50, being also connected to the working fluid distribution device 43 of the first hydraulic pump 42, is driven following the same secondary steps used for the drive of the articulated arm 15 in the first, second and, respectively, third functioning mode F5A (FIG. 14), F5B (FIG. 15) and F5C (FIG. 16).

In a fourth, fifth and sixth functioning mode F5D (FIG. 17), F5E (FIG. 18) and F5F (FIG. 19) the articulated arm 15 is driven like in the corresponding first, second and third functioning mode F5A, F5B and F5C of the fifth main step. The second auxiliary service 50, on the other hand, in the fourth and fifth functioning mode F5D (FIG. 17), F5E (FIG. 18) is driven by the internal combustion engine 12 which transmits, by means of the second power take-off 27, mechanical energy to the third hydraulic pump 47 which is responsible for driving the auxiliary services 45, whereas in the sixth step F5F (FIG. 19) it is driven by means of the second electric motor 51 which drives the third hydraulic pump 47 like in the fourth functioning mode F4D of the fourth main step.

In accordance with an aspect of the present invention, in case of a fault of the first drive unit 30, or of a fault of the second electric motor 51, the method also provides for a sixth and a seventh main driving step.

Figure 20:
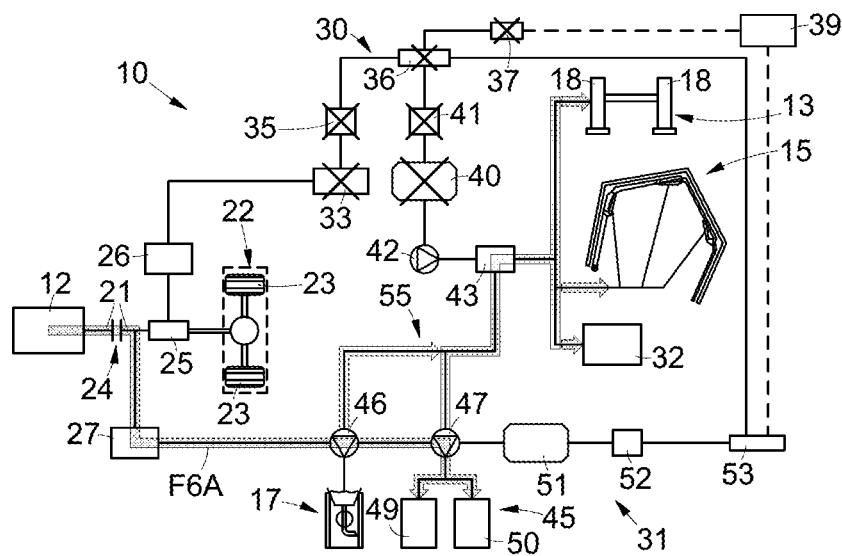
FIGS. 20, 21 are schematic representations of a sixth driving step of the mobile operating machine of FIG. 1.
Figure 21:
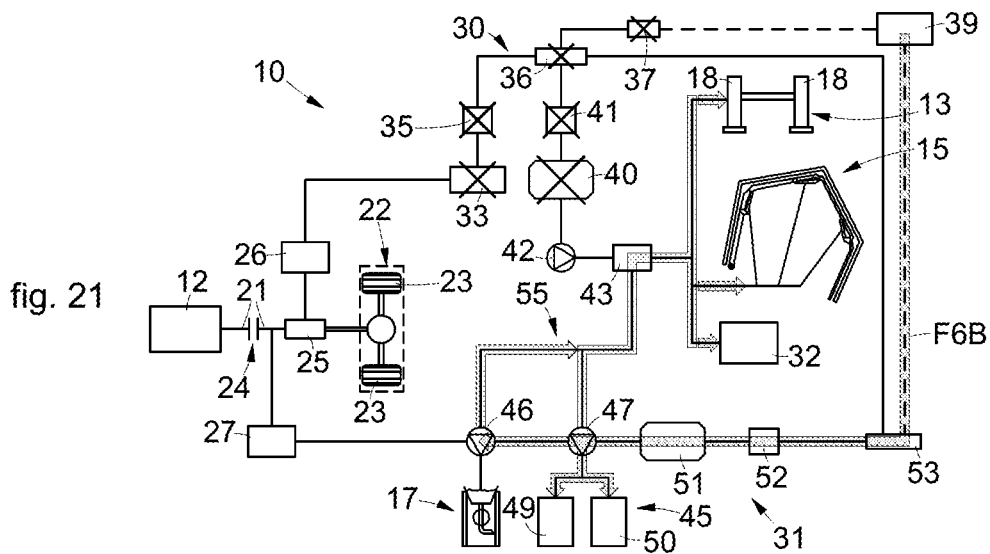

In the sixth main step, illustrated in FIGS. 20 and 21, the first drive unit 30 is in a faulty condition, therefore the drive of the stabilization unit 13, of the articulated arm 15 and of the primary services 32 takes place by means of the emergency circuit 55 connected to the hydraulic pumps 46 and 47, respectively in a first functioning mode F6A and in a second functioning mode F6B.

In particular, in the first functioning mode F6A (FIG. 20) the hydraulic pumps 46 and 47 are driven by means of the internal combustion engine 12 like it happens in the first functioning mode F4A of the fourth main step, whereas in the second functioning mode F6B (FIG. 21) the hydraulic pumps 46 and 47 are driven by means of the second electric motor 51 like it happens in the fourth functioning mode F4D of the fourth main step. In both functioning modes F6A and F6B, the emergency circuit 55 allows the working fluid pumped by the hydraulic pumps 46 and 47 to be transmitted to the distribution device 43 for the drive of the stabilization unit 13, of the articulated arm 15 and of the primary services 32.

It is specified that the pumping of working fluid to the distribution device 43 can take place by means of only one of the hydraulic pumps 46, 47 or of both.

Figure 22:
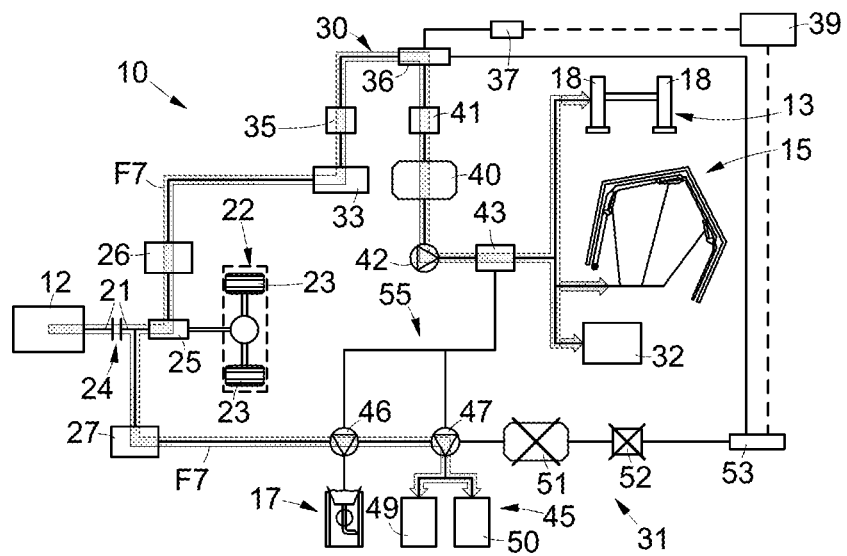
FIG. 22 is a schematic representation of a seventh driving step of the mobile operating machine of FIG. 1.

In the seventh main step F7, illustrated in FIG. 22, the second electric motor 51 is in a faulty condition and the electrical network 39 is not present on site; in this case, the drive of the operating components of the operating machine 10 takes place through the internal combustion engine 12 like in the first or second functioning mode F4A, F4B of the fourth main step, or through the electric accumulator 36 like in one of the second functioning modes F1B, F2B, F3B of the first, second and third main step.

It is clear that modifications and/or additions of parts can be made to the operating machine 10 and to the method described above, without leaving the scope of the present invention as defined by the claims.

For example, in accordance with another embodiment of the present invention, not represented in the drawings, the pumping unit 17 could be driven by the first drive unit 30, i.e. by means of the electric accumulator 36.

It is also clear that, although the present invention has been described with reference to some specific examples, a person skilled in the art will be able to make other equivalent forms of a hybrid mobile operating machine and its functioning method, having the characteristics expressed in the claims and therefore all falling within the scope of protection defined by them.

In the following claims, the references in parentheses have the sole purpose of facilitating reading and must not be considered as limiting factors of the scope of protection defined by the claims themselves.

The invention claimed is:

1. A hybrid mobile operating machine comprising:
a motor vehicle driven by an internal combustion engine,
an articulated arm associated with a concrete delivery pipe,
a pumping unit suitable to pump concrete into said pipe,
a stabilization unit to stabilize said operating machine during the pumping and delivery of said concrete and primary services,
wherein said internal combustion engine is suitable to power at least a first power take-off and a second power take-off which can be activated selectively with respect to each other,
wherein to said first power take-off there is operatively connected a first drive unit comprising at least an electric accumulator, a first electric motor and a first hydraulic pump to selectively drive at least said stabilization unit, said articulated arm and said primary services, and
wherein to said second power take-off there is operatively connected a second drive unit comprising at least a second electric motor and a second hydraulic pump to drive at least said pumping unit, and
wherein said first drive unit and said second drive unit are operatively associated with each other and independent from each other, so that when one of either said first drive unit or said second drive unit is activated, it is possible to keep the other deactivated.

2. The hybrid mobile operating machine as in claim 1, wherein said first drive unit and said second drive unit are configured to be selectively connected to an external electrical energy source to recharge said electric accumulator and, respectively, drive said second electric motor.

3. The hybrid mobile operating machine as in claim 2, wherein said electric accumulator is provided with a connection device configured to connect at least said electric accumulator to said external electrical energy source, wherein said connection device can be moved by means of said primary services, and wherein said electric accumulator is associated with a generator operatively connected to said first power take-off and configured to receive mechanical energy at entry and generate electrical energy at output to recharge said electric accumulator.

4. The hybrid mobile operating machine as in claim 3, wherein said generator, said first electric motor and said second electric motor are each provided with a respective converter configured to manage a direct and/or alternating electrical energy at input and output of said generator, said first electric motor and, respectively, said second electric motor.

5. The hybrid mobile operating machine as in claim 2, which is also provided with secondary services, wherein said second drive unit also comprises a third hydraulic pump to drive at least said secondary services, and wherein said second hydraulic pump and said third hydraulic pump can be driven, even simultaneously, by said internal combustion engine or by said second electric motor.

6. The hybrid mobile operating machine as in claim 5, wherein said second electric motor is operatively connected to said electric accumulator and is configured to assume at least a first operating condition, in which said second electric motor converts an electrical energy supplied by said external electrical energy source into mechanical energy that drives said second and third hydraulic pumps, and a second operating condition, in which said second electric motor converts a mechanical energy of said internal combustion engine into electrical energy to recharge said electric accumulator.

7. The hybrid mobile operating machine as in claim 5, wherein the hybrid mobile operating machine comprises a central control unit operatively connected at least to said internal combustion engine, to said electric accumulator, to said first electric motor and to said second electric motor and configured to automatically manage the drive of said first drive unit and said second drive unit so as to favor and prefer an electrical functioning of said stabilization unit, of said articulated arm, of said pumping unit, of said primary services and of said secondary services, whether said electrical functioning derives from said electric accumulator or from said external electrical energy source.

8. A functioning method of a hybrid mobile operating machine comprising a motor vehicle, driven by an internal combustion engine, on which there are mounted at least a stabilization unit, an articulated arm, a pumping unit and primary services, wherein the functioning method provides one or more functioning steps of a first drive unit that is operatively connected to a first power take-off driven by said internal combustion engine, in which said stabilization unit, said articulated arm and said primary services are driven by a first hydraulic pump by means of a first electric motor powered by an electric accumulator of said first drive unit, and one or more functioning steps of a second drive unit that is operatively connected to a second power take-off driven by said internal combustion engine, in which said pumping unit is driven by a second hydraulic pump by means of a second electric motor of said second drive unit, and herein said first drive unit and said second drive unit are driven independently of each other, so that when one of either said first drive unit or said second drive unit is activated, it is possible to keep the other deactivated.

9. The functioning method as in claim 8, wherein the functioning method provides at least one connection step, in which said first drive unit and said second drive unit are selectively connected to an external electrical energy source to recharge said electric accumulator and, respectively, drive said second electric motor.

10. The functioning method as in claim 8, wherein the functioning method provides at least one functioning step of said second drive unit in which said pumping unit is driven by said internal combustion engine if said electric motor cannot be connected to said external electrical energy source.

\* \* \* \* \*